United States Patent [19]

Gunderson et al.

[11] Patent Number: 4,540,993

[45] Date of Patent: Sep. 10, 1985

[54] PLOTTER PEN

[75] Inventors: Charles Gunderson, Buena Park; Aftab H. Kapadya, Brea, both of Calif.

[73] Assignee: Sanders Associates, Inc., Nashua, N.H.

[21] Appl. No.: 633,172

[22] Filed: Jul. 23, 1984

[51] Int. Cl.³ ............... G01D 15/16; B43L 13/00
[52] U.S. Cl. .............................. 346/139 R; 33/18 R
[58] Field of Search ............ 346/139 R, 139 C, 140 R

[56] References Cited

U.S. PATENT DOCUMENTS

| | | | |
|---|---|---|---|
| 3,401,401 | 9/1968 | Read et al. | 346/140 R |
| 4,157,552 | 6/1979 | Nakajima | 346/139 R X |
| 4,405,931 | 9/1983 | Fujisawa | 346/139 R |
| 4,417,258 | 11/1983 | Tribolet et al. | 346/139 R |
| 4,441,109 | 4/1984 | Fujisawa | 346/139 R |
| 4,496,958 | 1/1985 | Brandt et al. | 346/139 R |

Primary Examiner—George H. Miller, Jr.
Attorney, Agent, or Firm—Louis Etlinger; W. F. Porter, Jr.

[57] ABSTRACT

A pen for use in a graphics plotter employing a turret head with optical scanning of the pens. The upper portion of a cylindrical pen body having a centrally located guide ridge for positioning the pen in the gripping arms is provided with a retaining ridge, a support ridge, and a stop shoulder over which a sleeve is removably snap fit. The sleeve is provided with a reflective tape outer surface heat-bonded to the sleeve.

6 Claims, 7 Drawing Figures

PLOTTER PEN

BACKGROUND OF THE INVENTION

The present invention relates to pens for use in graphic plotters and, more particularly, to a pen for use in a turret headed graphics plotter which pen employs a removable and exchangeable sleeve containing pen type indicating indicia and which is optically scannable.

In co-pending application, Ser. No. 633,174, filed on even date herewith and titled, "Graphics Plotter Turret Head" by co-inventor Charles Gunderson of this application and co-pending application, Ser. No. 633,170, filed on even date herewith titled, "Pen Turret Control System" by the applicants herein, both assigned to the common assignee of this application, there is disclosed a turret head and an associated control system for a graphics plotter wherein the turret head and its associated pen holder move with the pen carriage to provide exchangeability of eight pens adjacent the writing site. As part of the operation thereof, and as disclosed therein, the pens are scanned by an optical scanning system to determine their presence at the various turret positions as well as their particular type for individualized control of operation.

It is the object of the present invention to provide a pen for the turret head plotter and control system of the abovementioned, co-pending applications which is particularly suited for use therein so as to provide optimum performance characteristics.

SUMMARY

The foregoing objective has been met by the pen of the present invention which is adapted for use in a turret headed graphics plotter which includes a gripping arm for releasably gripping pens and optically scanning the pens with a light beam sensor which pen comprises a hollow cylindrical body having top, middle and bottom portions, the bottom portion being adapted to carry a writing tip and the middle portion being adapted to be releasably gripped by the gripping means and including a circumferential guide ridge for repeatably positioning the pen longitudinally with respect to the gripping means; a retaining ridge disposed circumferentially about the outer surface of the pen body adjacent the top end of the top portion and; a support ridge disposed circumferentially about the outer surface of the pen body adjacent the boundary of the top and middle portions, the support ridge being substantially the same height above the outer surface of the pen body as the retaining ridge; a stop shoulder disposed between the support ridge and the guide ridge at a distance from the guide ridge such that will put the area between the stop shoulder and the retaining ridge adjacent the stop shoulder repeatably and accurately in the path of the scanning light beam when the pen is in the gripping means; and, a cylindrical sleeve having an inside diameter sized with relationship to the retaining ridge and the support ridge such that the sleeve can be slid over the ridges into abutment with the stop shoulder, the sleeve also having circumferentially disposed gripping projections along its inner surface adapted to releasably snap over the retaining ridge and hold the sleeve against movement in abutment with the stop shoulder, the sleeve further having a reflective outer surface for reflecting the light beam.

In the preferred embodiment, the sleeve is of a plastic material and the reflective outer surface comprises a reflective metal tape heat-bonded to the sleeve.

DESCRIPTION OF THE PREFERRED EMBODIMENT

Figure 1:
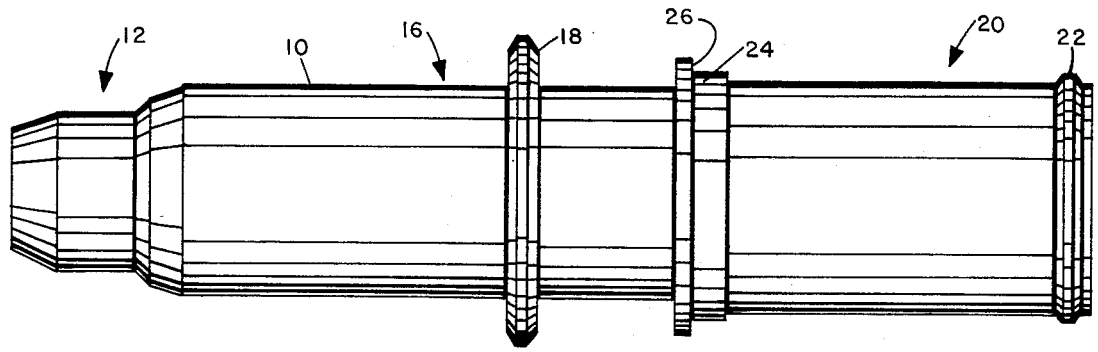
FIG. 1 is a drawing of the body of a pen according to the present invention.
Figure 2:
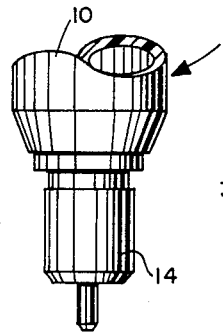
FIG. 2 shows the bottom portion of the body of FIG. 1 with a writing tip mounted therein.
Figure 3:
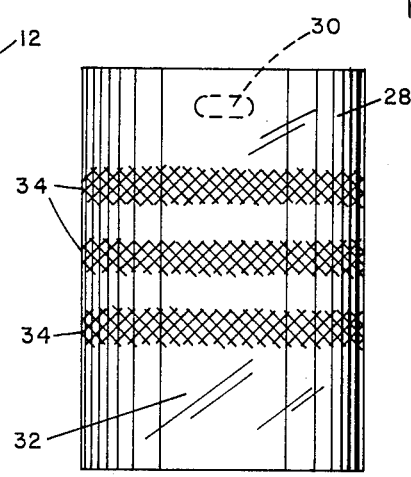
FIG. 3 is a drawing of the indicia-bearing reflective sleeve adapted for mounting on the body of FIG. 1 according to the present invention.
Figure 5:
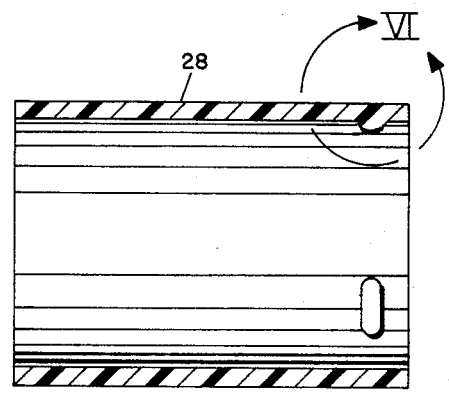
FIG. 5 is a cutaway drawing through the sleeve of FIG. 4 in the plane V—V.

The pen body of the pen of the present invention in its preferred embodiment is generally indicated as 10 in FIG. 1. Pen body 10 comprises a bottom portion 12 adapted to receive a writing tip 14 as shown in FIG. 2, a middle portion 16 containing a circumferential guide ridge 18 adapted for gripping by the gripping portions of the turret and pen holder in the above-referenced Gunderson application wherein the guide ridge 18 is adapted to mate with grooves provided therefor in the gripping portion for repeatably positioning the pen body 10 longitudinally with respect to those gripping means; and, a top portion 20 of primary interest to the present invention. That is to say, the bottom portion 12, writing tip 14, and middle portion 16 are of a construction generally known in the art and, as such, form no particularly novel point of the present invention except to the degree that they define particular spatial relationship between elements.

Adjacent the extreme top end of the top portion 20, a retaining ridge 22 is disposed circumferentially about the outer surface of the generally cylindrical pen body 10. A support ridge 24 is disposed circumferentially about the outer surface of the pen body 10 adjacent the boundary of the top and middle portions, 20, 16. The ridges 22, 24 are of substantially the same diameter and, therefore, also are of substantially the same height above the outer surface of the pen body 10. A stop shoulder 26 is disposed between the support ridge 24 and the guide ridge 18 adjacent ridge 24 and is positioned from the guide ridge 18 a distance such that will put the area between the stop shoulder 26 and retaining ridge 22 adjacent the stop shoulder 26 repeatably and accurately in the path of the scanning light beam when the pen 10 is being gripped by the gripping means of the turret (not shown). This is an important aspect of the present invention because it couples the ability to change the indicia-bearing collar to be described shortly with an assured alignment for readability by the scanning system.

Figure 4:
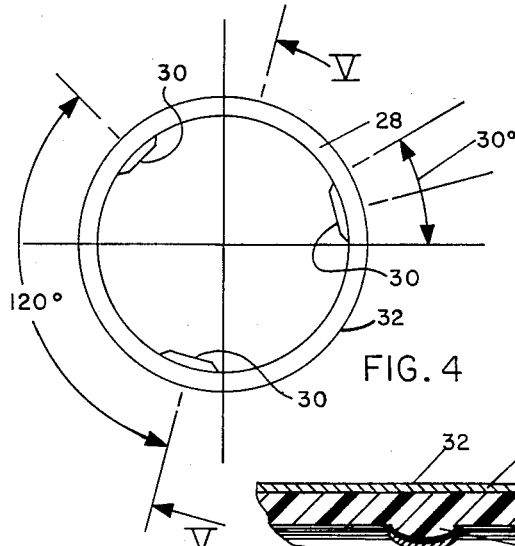
FIG. 4 is a top end view of the sleeve of FIG. 3.
Figure 6:
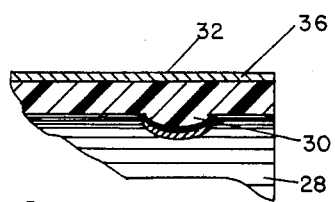
FIG. 6 is an enlarged view of the segment of FIG. 5 indicated as VI.
Figure 7:
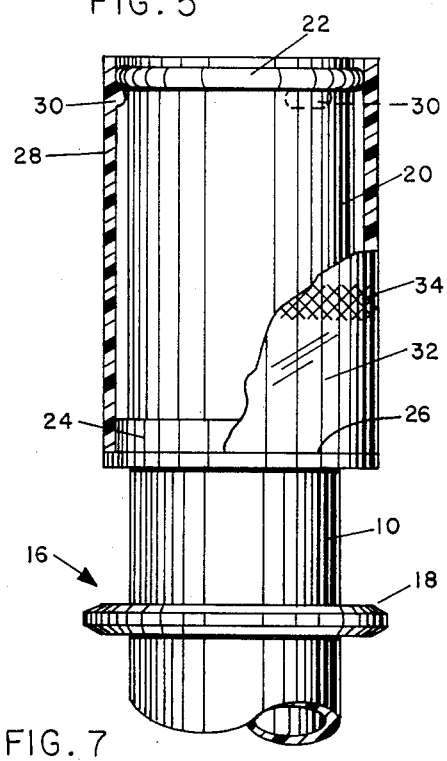
FIG. 7 is a partially cutaway view of the sleeve of FIGS. 3-6 mounted on the top end of the body of FIG. 1.

Turning now to FIGS. 3-6, the indicia-bearing sleeve 28 is shown. As with the pen body 10, sleeve 28 is of injection-molded plastic so as to be resiliently flexible, allowing it to deform sufficiently to provide the releasable snap-fit to be described. Sleeve 28 is a thin-walled cylinder being of a length substantially identical to the distance from the stop shoulder 26 to the top end of the top portion. Its inside diameter is just slightly larger than the diameter of the ridges 22, 24 whereby the sleeve 28 can be snugly slid over the ridges 22, 24 and placed into abutment with the stop shoulder 26 to be held firmly in place in proper alignment with the scanning apparatus of the turret system of the above-described co-pending applications. Sleeve 28 has gripping projections 30 disposed circumferentially along its inner surface adjacent the end opposite that abutting the stop shoulder 26. As shown in FIG. 4, in the preferred embodiment, there are three projections 30 disposed at 120° intervals and subtending 30° of arc each. The projections 30 extend inwardly from the inner surface of the sleeve 28 a distance substantially equal to the degree of projection of the ridges 22, 24 above the outer surface of the pen body 10. Further, the projections 30 are disposed just inward of the retaining ridge 22 when the sleeve 28 is in abutment with the stop shoulder 26 such that as the sleeve 28 is slid over the ridges 22, 24 into abutment with the stop shoulder 26 as shown in the partially cutaway view of FIG. 7, the gripping projections 30 snap over the retaining ridge 22 and releasably hold the sleeve 28 onto the top portion 20 of pen body 10 in the proper alignment as previously described.

As described in the above-mentioned co-pending application of the co-inventors herein, sleeve 28 has an outer surface 32 which is reflective containing a plurality of type-indicating non-reflective bands 34. In the preferred embodiment, outer surface 32 is comprised of a reflective aluminum foil sold as Part No. CA 40-100E by the Crown Roll Leaf Company and indicated as 36 in FIG. 6. Foil 36 is applied as two layers of foil wrapped fully around the outside diameter and held firmly in place by the application of a hot stamping process according to a technique employed by the AFM Engineering Company of Santa Ana, Calif.

Thus, it should be appreciated by those skilled in the art that the pen of the present invention, as thus described, provides the ability to change the indicia-bearing sleeve 28 to correspond with changeable coding systems as employed in particular plotting projects while, at the same time, assuring that the reflective outer surface 32 is placed and maintained in proper sensible alignment for the optical sensing apparatus of the turret and its control system according to the above-described co-pending applications.

Wherefore, having thus described our invention, we claim:

1. In a pen for a graphics plotter having a hollow, cylindrical body having top, middle and bottom portions wherein the bottom portion is adapted to carry a writing tip and the middle portion is adapted to be releasably gripped by a gripping means and includes a circumferential guide ridge for repeatably positioning the pen longitudinally with respect to the gripping means, the improvement for permitting the pen to be accurately and repeatably optically scanned by a light beam for data-coveying indicia comprising:
   (a) a retaining ridge disposed circumferentially about the outer surface of the pen body adjacent the top end of the top portion;
   (b) a support ridge disposed circumferentially about the outer surface of the pen body adjacent the boundary of the top and middle portions, said support ridge being of substantially the same height above the outer surface of the pen body as said retaining ridge;
   (c) a stop shoulder disposed between said support ridge and the guide ridge at a distance from the guide ridge such that will put the area between said stop shoulder and said retaining ridge adjacent said stop shoulder repeatably and accurately in the path of the scanning light beam when the pen is in the gripping means; and,
   (d) a cylindrical sleeve having an inside diameter sized with relationship to said retaining ridge and said support ridge such that said sleeve can be slid over said ridges into abutment with said stop shoulder, said sleeve also having circumferentially disposed gripping projections along its inner surface adapted to releasably snap over said retaining ridge and hold said sleeve against movement in abutment with said stop shoulder, said sleeve further having a reflective outer surface for reflecting a light beam.

2. The improvement of claim 1 wherein:
   (a) said sleeve is of a resiliently deformable plastic material; and,
   (b) said reflective outer surface comprises a reflective tape heat-bonded to said sleeve.

3. The improvement of claim 1 wherein:
   said reflective outer surface comprises a reflective metal foil disposed circumferentially about said sleeve.

4. A pen for use in a turret headed graphics plotter which includes a gripping arm for releasably gripping pens and optical scanning means for optically scanning the pens with a light beam sensor, the pen comprising:
   (a) a hollow, cylindrical body having top, middle and bottom portions, said bottom portion being adapted to carry a writing tip and said middle portion being adapted to be releasably gripped by the gripping arm and including a circumferential guide ridge for repeatably positioning the pen longitudinally with respect to the gripping arms;
   (b) a retaining ridge disposed circumferentially about the outer surface of said pen body adjacent the top end of said top portion;
   (c) a support ridge disposed circumferentially about the outer surface of said pen body adjacent the boundary of said top and middle portions, said support ridge being of substantially the same height above the outer surface of said pen body as said retaining ridge;
   (d) a stop shoulder disposed between said support ridge and said guide ridge at a distance from said guide ridge such that will put the area between said stop shoulder and said retaining ridge adjacent said stop shoulder repeatably and accurately in the path of the scanning light beam when the pen is in the gripping arm; and,
   (e) a cylindrical sleeve having an inside diameter sized with relationship to said retaining ridge and said support ridge such that said sleeve can be slid over said ridges into abutment with said stop shoulder, said sleeve also having circumferentially disposed gripping projections along its inner surface adapted to releasably snap over said retaining ridge and hold said sleeve against movement in abutment with said stop shoulder, said sleeve further having a reflective outer surface for reflecting the light beam.

5. The improvement of claim 4 wherein:
   (a) said sleeve is of a resiliently deformable plastic material; and,
   (b) said reflective outer surface comprises a reflective tape heat-bonded to said sleeve.

6. The improvement of claim 4 wherein:
   said reflective outer surface comprises a reflective metal foil disposed circumferentially about said sleeve.

* * * * *